Jan. 1, 1935.  F. H. SCHNEIDER  1,986,017
COMBINED RACK, DRIP PAN, BAFFLE, AND LIGHTER FOR RANGES
Filed Dec. 11, 1931
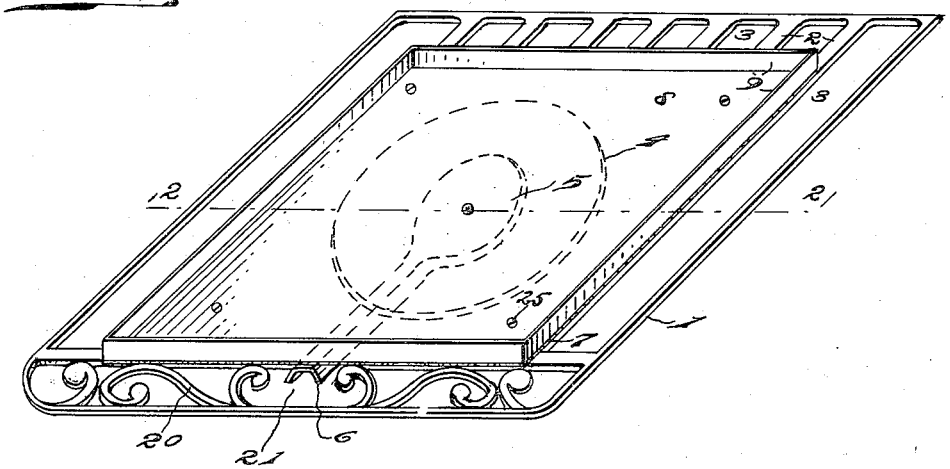
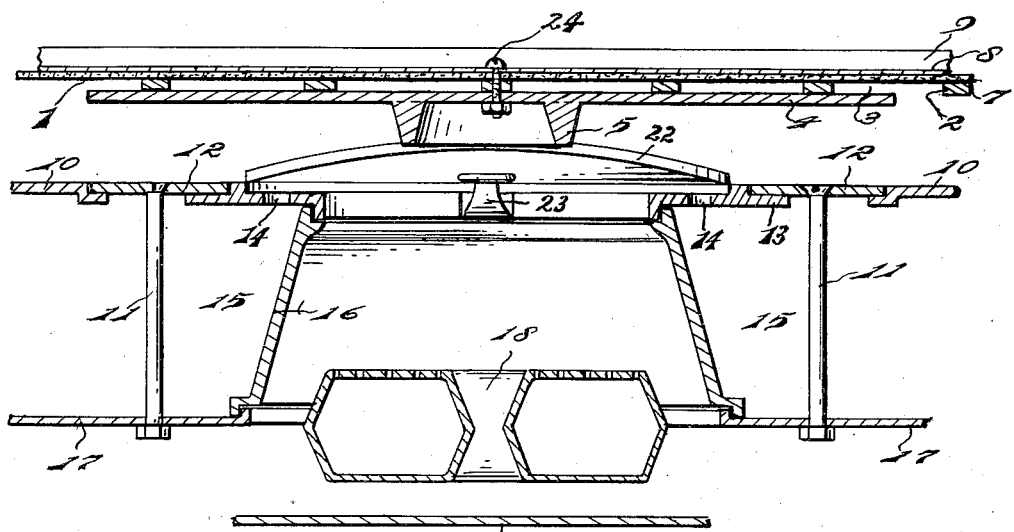
INVENTOR.
Frank H. Schneider
BY
Herbert S. Fairbanks
ATTORNEY.

Patented Jan. 1, 1935

1,986,017

UNITED STATES PATENT OFFICE 1,986,017

COMBINED RACK, DRIP PAN, BAFFLE, AND LIGHTER FOR RANGES

Frank H. Schneider, Spring City, Pa., assignor to The Floyd-Wells Company, Royersford, Pa., a corporation of Pennsylvania Application December 11, 1931, Serial No. 580,303

2 Claims. (Cl. 126—22)

The object of this invention is to devise a novel combined rack, drip pan, baffle and lighter for ranges which forms a unit of structure insertable into place and removable therefrom as a unit of structure.

A further object of the invention is to devise a novel baffle plate and lighter which can be made in one piece and cast integral with the baffle plate.

A further object of the invention is to provide in a device of this character, a novel construction of ribs which provide air spaces for the proper circulation of the air.

A further object of the invention is to devise in a construction of this character a heat distributor pan which, by having its edges turned up on all four sides, forms a drip pan to catch the overflow of any materials being baked and prevents their falling into the oven burners.

With the above and other objects in view, as will hereinafter more clearly appear, my invention comprehends a novel combined rack, drip pan, baffle and lighter for ranges.

It further comprehends a novel device of this character wherein the baffle and lighter are cast integral and connected with the rack so that the oven burner can be lit without the removal of the rack from the oven.

Other novel features of construction and advantage will hereinafter more clearly appear in the detailed description and the appended claims.

For the purpose of illustrating the invention, I have shown in the accompanying drawing a typical embodiment of it, which, in practice, will give satisfactory and reliable results. It is, however, to be understood that the various instrumentalities of which my invention consists can be variously arranged and organized and my invention is not limited to the exact arrangement and organization of these instrumentalities as herein set forth.

Figure 1 is a perspective view of a combined rack, drip pan, baffle and lighter for ranges, embodying my invention.

Figure 2 is a section on line 2—2 of Figure 1, showing in addition the gas burner and certain of its adjuncts.

Similar numerals of reference indicate corresponding parts.

Referring to the drawing:—

1 designates a rack, the contour of which may vary widely in practice, but which, for the purpose of illustration I have shown as being rectangular, and is provided with cross ribs 2 forming the openings 3. 4 designates a centrally disposed baffle plate having a lighter cup 5 from which extends outwardly a U shaped channel 6. Above the rack 1 is disposed a sheet of insulation 7, such as, for example, a sheet of asbestos. This sheet of insulation is of the same area as the bottom of a heat distributor pan 8, the sides of which are upwardly deflected as at 9 in order to form a drip pan. This drip pan is fixed to the rack in any desired manner so as to form a unit of construction therewith.

10 designates the bottom oven plate which is recessed to receive a bolt 11 which passes through a ring 12 which is also seated on a flanged ring 13 having ports 14 opening through it and communicating with the flue 15 which leads to the exit flue of the range. The flanged ring 13 is seated on the cone-shaped casing 16 which is flanged to overhang a bottom plate 17.

18 designates the gas burner and 19 a baffle plate disposed beneath the gas burner. The forward marginal portion of the rack is provided with the scrolls 20 so that openings 21 are provided through the rack.

My present invention is especially adapted to be employed in a combined coal and gas range where a common oven is provided to be used when either coal or gas are employed as the heating medium. In this type of construction it is common as shown in the Carter and Bibb Patent No. 1,211,916, to employ a removable cover 22 which is connected by means of a hinge connection 23 with the ring 13 so that when coal is employed as the fuel the upper end of the burner casing 16 will be closed so that gas cannot enter the oven. When gas is to be used as the fuel this cover 22 is moved rearwardly to uncover the ports 14 which act as vents and also the upper end of the burner casing 16. With the rack in position the cover cannot be opened, therefore it is necessary to first remove the rack when gas is to be used as the fuel, remove the cover 22, and reinsert the rack in position within the oven so that the baffle is over the burner casing and the lighter cup is directly above the burner 18. The walls of the burner 16 converge upwardly so that the gas is directed towards the chamber in the lighter cup.

The manner in which my novel combined rack, drip pan, baffle and lighter is employed will now be readily apparent to those skilled in this art and is as follows.

If the cover 22 is closed and the rack is in position in the oven the cover cannot be opened. If, however, the cover 22 has been moved into its open position and the rack is in position in the oven the burner 18 can be lit by turning on the gas and applying a match to the opening 21 so that the flame can pass through the passage of the channel 6 to the chamber of the lighter cup in which the gas is collected. The baffle and lighter are preferably centrally disposed above the burner casing.

The distributor pan 8 is secured to the rack and the baffle in any desired manner, and, as illustrated, by means of a fastening device 24 which passes through the drip pan, the rack and the baffle. The fastening devices 25 connect the heat distributor pan with the rack.

It will thus be seen that the entire device forms a unitary structure insertable into and removable from the oven as a unit of structure.

It will now be apparent that I have devised a new and useful combined rack, drip pan, baffle and lighter for ranges which embodies the features of advantage enumerated as desirable in the statement of the invention and the above description, and while I have, in the present instance, shown and described a preferred embodiment thereof which will give in practice satisfactory and reliable results, it is to be understood that this embodiment is susceptible of modification in various particulars without departing from the spirit or scope of the invention or sacrificing any of its advantages.

Having thus described my invention what I claim as new and desire to secure by Letters Patent, is:—

1. In a device of the character described, a rack, a baffle beneath said rack having a lighter cup provided with means extending to the front end of the rack to direct flame to the cup, and a heat distributor pan above the rack and serving as a drip pan.

2. In a device of the character described, a rack, a centrally disposed baffle, secured to the bottom of the rack, and having integral with it a lighter cup having a chamber open at its bottom and having a channel leading from the front end of the rack to such chamber, a sheet of insulation above the rack, and a combined heat distributor and drip pan above said insulation and secured to said rack.

FRANK H. SCHNEIDER.